March 16, 1965   P. H. DUNN ETAL   3,173,223
INSECT KILLING DEVICE
Filed Sept. 24, 1963

INVENTORS
Paul H. Dunn,
Byron J. Mechalas

BY
Burns, Doane, Benedict, Swecker & Mathis
ATTORNEYS 3,173,223
INSECT KILLING DEVICE
Paul H. Dunn, San Jacinto, and Byron J. Mechalas, Hemet, Calif., assignors to Nutrilite Products, Inc., Buena Park, Calif., a corporation of California
Filed Sept. 24, 1963, Ser. No. 311,183
4 Claims. (Cl. 43—131)

This invention relates to a compact device for efficiently killing insects. More particularly, the invention relates to a device that is adapted for the destruction of insects which are members of the order Diptera, such as house flies, as well as other insect pests.

Throughout history man has been plagued by the presence of insects and the disease producing organisms which insects may transport. Over the years attempts have been made to eradicate certain types of insects with varying degrees of success. The fact remains, however, that even in this age of rapidly advancing technology, man is still far from conquering the insect pests which have been with him throughout the centuries.

It is an object of the invention to provide a compact and efficient insect killing device which is capable of destroying large numbers of flies or other insects.

It is an object of the invention to provide an insect killing device in which the toxicant and odor emitting attractant are situated at different locations within the device, thus preventing the attractant from becoming masked by the presence of dead insects.

It is an object of the invention to provide an insect killing device which is not objectionable to the sight, and which retains the bodies of the dead insects out of view even after long periods of use.

It is also an object of the invention to provide an insect killing device which if desired may be easily emptied without the necessity of handling the dead insects or the unused toxicant.

It is a further object of the invention to provide an insect killing device which is provided with access holes suitable for providing the proper "edge situation" which has been found to be preferred by flies during feeding.

Other objects of the invention and the nature and advantages of the invention will further appear from the following more detailed description.

Figure 1:
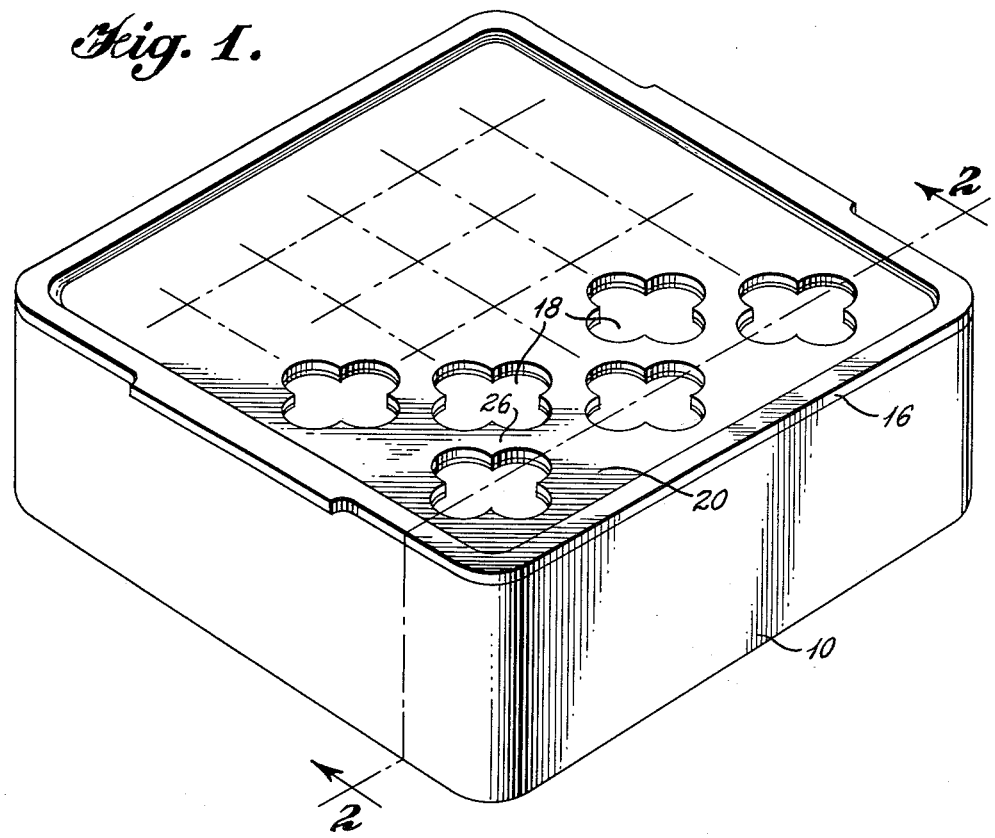
FIGURE 1 is a perspective view of a preferred embodiment of the insect killing device, in which only a few representative access holes are shown.
Figure 2:
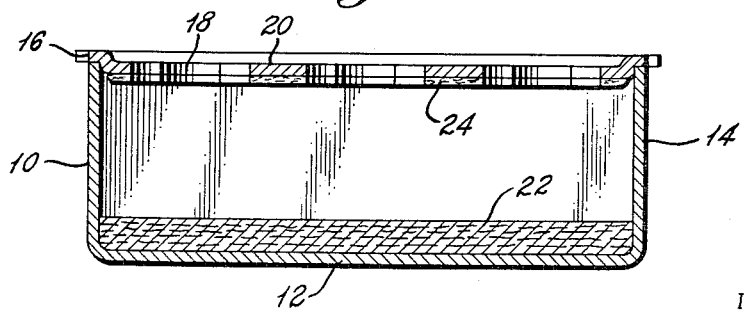
FIGURE 2 is a sectional view of the insect killing device on line 2—2.

The invention comprises a body unit or container 10. As illustrated in FIGURES 1 and 2, the body unit 10 may satisfactorily be of a substantially rectangular configuration, having a floor 12 and side walls 14. However, the exact shape of the unit or number of sides is in no way critical to the efficient operation of the device and various geometric cross-sections may be chosen for the configuration of the body unit such as circles, triangles, pentagons, etc. Suitable dimensions for a rectangular insect killing device for household use according to the invention may define a body unit about five inches square and about one and one-half inches deep, though other dimensions can of course be used similarly.

A transverse member, such as a removable lid 16, is designed to fit securely over the body unit 10 or extend between the container walls 14 and is provided with at least one, but preferably with a plurality of access holes or openings 18. The access holes may be formed in any geometric configuration which will allow easy insect access. For destroying house flies and other insects, for instance, one satisfactory configuration, as shown in FIGURE 1, is a shape resembling that of a four leaf clover. However, the access holes 18 may satisfactorily be of an elliptical or circular shape in which the diameter is about one-half inch, i.e. sufficiently large to permit the insect to enter inside the unit. The exact number of access holes 18 which are formed within the lid 16 is unimportant to the operation of the invention so long as there is an adequate lid surface area 20 remaining between the holes to provide a partial barrier for the retention of toxic vapors emitted by the toxicant 22. A particularly satisfactory barrier has been found to result when approximately 65 to 85 percent of the total lid area is solid. The walkways 26 between the holes may suitably be about ⅛ to ⅜ inch in width at the narrowest point.

The insect killing device according to the invention as illustrated in FIGURES 1 and 2 is provided with a removable lid 16. Similar insect killing devices having a secured lid and one or more removable side walls or floor may also be produced. However, when re-use is not desired, suitable disposable insect killing devices may be formed in which the lid, floor, and side walls are permanently secured to the body unit or container.

The body unit and lid may be formed from a wide variety of non-transparent materials such as wood, metal, plastic or even heavy cardboard when it is not contemplated the device will be employed out of doors where it must withstand showers or moisture generally over long periods.

A basically non-toxic attractant or bait 24 is secured within the container by glue or any other suitable means to the transverse member, such as the underside of lid 16, or to the inner walls of the container above the floor and is out of view to an observer, but nevertheless serves as a potent attractant which is readily perceived by an insect's senses. Particularly satisfactory attractants for use in the insect killing device may be formed by combining fermentation materials such as yeast extract with oviposition substrates such as whey, in a manner otherwise known in the art. The specific insect attractant employed in the device is not critical to its operation under normal conditions and any substance which attracts insects may be used, such as a fabric base material lightly impregnated with honey, moistened sugar, or moistened sugar with a dye. The use of attractants other than sugar or the like is advantageous since it is not necessary that the attractant be kept moistened. Also, should a non-sugar attractant be accidentally exposed to much water, such as a rainstorm, the operation of the device will not be impaired for future use as would devices employing sugar which would tend to completely dissolve. It is desirable that any attractant employed be relatively non-adhesive so that the bodies of insects will freely fall to the base of the unit and not adhere to the attractant.

On the floor 12 of the body unit 10 is situated a toxicant or insecticide 22 capable of yielding vapors which are toxic to insects. The toxicant 22 may be satisfactorily incorporated in a wax or wax-like solid material, such as a combination of montan wax and a suitable softening or plasticizing agent, and placed upon the floor of the body unit 10 by the manufacturer, thus eliminating the need for the consumer to ever handle the toxicant. An example of a particularly effective toxicant for use in the insect killing device is dimethyldichlorovinyl phosphate, known as DDVP, which is relatively volatile and toxic to DDT-resistant strains of flies. The particular vapor yielding toxicant employed in the device is not critical to its operation. Any vapor yielding toxicant may suitably be employed, such as the O,O-dimethyl dithiophosphate of diethyl mercaptosuccinate, commonly known as malathion.

The insect killing device is designed primarily for the killing of flies, i.e., insects of the order Diptera. However, provided that its access holes are of the proper size, the device is also effective for killing insect pests generally such as cockroaches, ants, and other household pests. The device is particularly suited for killing the common house fly (*Musca domestica*), as well as blow flies, fruit flies, dung flies, gnats, and similar pests.

The design of the insect killing device has been influenced by experimentation directed to the determination of the feeding behavior of house flies. From careful observation of such feeding habits it was learned that flies prefer to feed at an edge. The invention, in making use of this finding, provides an efficient combination of numerous feeding edges, attractant escape area, and vapor retention barrier to prevent excessive loss of insecticide.

A fly or other insect within the vicinity of the novel insect killing device is attracted by essences emitted by the attractant 24 which are readily perceived by the insect's senses. The insect will likely land on or climb to the solid area of the lid portion 20 and explore in an effort to determine the attractant's source. Since numerous access holes 18 may be provided within the lid 16, such an access hole will always be nearby. As the insect assumes a feeding position on the edge of the access hole and attempts to reach the attractant, the insect is overcome by vapors which are emitted from the toxicant 22 situated on the floor 12 of the body unit 10. The plurality of access holes 18 provides ready access to the attractant for large populations of flies or other insect pests at one time.

Insects killed in this manner fall through the access holes to the base of the body unit which is capable of retaining large numbers of insects out of the view of an observer. Since the bodies of the insects do not remain in the odor emitting attractant, no masking of the bait occurs as in prior art devices in which the toxicant and attractant are situated at the same location.

Devices according to the invention which are provided with a removable lid or wall may be easily emptied without the necessity of handling the dead insects or the unused portion of the toxicant by merely removing such lid or other wall and discharging the dead insects from the body unit.

The insect killing device is not objectionable to sight and does not call attention to the insect problem. Since the container, the attractant, and the toxicant which is located out of easy reach, are not and do not appear to be edible, considerable safety advantages for children and pets are provided.

Although the invention has been described in connection with a preferred embodiment, it is to be understood that variations and modifications may be resorted to as will be apparent to those skilled in the art. Such variations and modifications are to be considered within the purview and scope of the claims appended hereto.

What is claimed is:

1. An insect killing device comprising a non-transparent container possessing a floor and side walls, a transverse member extending between the container walls and possessing at least one opening large enough to permit passage of insects downwardly therethrough, an attractant for insects secured within the container above the floor, and a vapor yielding toxicant incorporated in a wax-like material situated beneath the transverse member of the container, the vapors of said toxicant being toxic to insects.

2. An insect killing device according to claim 1 in which the transverse member extending between the container walls is a lid possessing a plurality of holes which forms a partial barrier for the retention of toxic vapors and is solid from about 65 to 85 percent of the total lid area.

3. An insect killing device according to claim 1 in which the transverse member extending between the container walls is a removable lid.

4. An insect killing device comprising a non-transparent body unit, a removable lid for said body unit provided with a plurality of access holes, an odor emitting attractant for insects secured to the underside of the removable lid, and a vapor yielding insecticide incorporated in a wax-like solid material on the floor of the body unit, the vapors of said insecticide being toxic to insects.

References Cited by the Examiner

UNITED STATES PATENTS

| | | | |
|---|---|---|---|
| 126,180 | 4/72 | Burgess | 43—122 |
| 171,673 | 1/76 | Littlefield | 43—131 |
| 818,836 | 4/06 | Lenthier et al. | 43—122 |
| 1,018,277 | 2/12 | Suhre | 43—122 |
| 1,631,121 | 6/27 | Eckl | 43—131 |
| 2,363,852 | 11/44 | Beekler | 167—48 |
| 3,116,201 | 12/63 | Whetstone et al. | 167—22 |

ABRAHAM G. STONE, *Primary Examiner.*

F. RAY CHAPPELL, *Examiner.*